US012703435B2

(12) United States Patent
Prior et al.

(10) Patent No.: US 12,703,435 B2
(45) Date of Patent: Aug. 11, 2026

(54) TAILGATE SUBASSEMBLY PRESETTING METHOD AND TAILGATE ASSEMBLY HAVING PRESET SUBASSEMBLIES

(71) Applicant: Ford Global Technologies, LLC, Dearborn, MI (US)

(72) Inventors: Joseph Prior, Detroit, MI (US); Joshua Robert Hemphill, White Lake, MI (US); Raul Ezequiel Alvarez Ruiz, Estado de Mexico (MX); Michael Shawn Watterworth, Brighton, MI (US); Cheryl Ann Engel, Jackson, MI (US); Dinesh Murali, Chennai (IN)

(73) Assignee: Ford Global Technologies, LLC, Deaborn, MI (US)

( * ) Notice: Subject to any disclaimer, the term of this patent is extended or adjusted under 35 U.S.C. 154(b) by 542 days.

(21) Appl. No.: 18/313,081

(22) Filed: May 5, 2023

(65) Prior Publication Data

US 2024/0367729 A1 Nov. 7, 2024

(51) Int. Cl.
*B62D 33/027* (2006.01)

(52) U.S. Cl.
CPC ................................ *B62D 33/0273* (2013.01)

(58) Field of Classification Search
CPC .. B62D 33/0273; B62D 33/03; B62D 65/024; B62D 65/06; B60J 5/108; E05Y 2900/544
USPC ............................... 296/50, 51, 57.1, 146.12
See application file for complete search history.

(56) References Cited

U.S. PATENT DOCUMENTS

2003/0015885 A1* 1/2003 Landwehr .......... B62D 33/0273 296/61
2009/0183433 A1* 7/2009 Cheung .............. B62D 33/0273 49/169
2012/0126564 A1* 5/2012 Hausler .............. B62D 33/0273 296/57.1
2012/0324793 A1* 12/2012 Abbasi ............... B62D 33/0273 49/168
2021/0163082 A1* 6/2021 Borkar ...................... B60R 3/02
2022/0001728 A1* 1/2022 Nania ................ B62D 33/0273
2022/0227209 A1 7/2022 Nania et al.
2022/0371667 A1* 11/2022 Hemphill ........... B62D 33/0273

FOREIGN PATENT DOCUMENTS

EP 4144610 3/2023

* cited by examiner

*Primary Examiner* — Wenwei Zhuo
(74) *Attorney, Agent, or Firm* — Vichit Chea; Carlson, Gaskey & Olds, P.C.

(57) ABSTRACT

The tailgate assembly method includes presetting a frame subassembly of a tailgate assembly relative to a vehicle structure; and presetting a door subassembly of the tailgate assembly relative to the frame subassembly. The frame subassembly can include a cargo bed access opening between a driver side section and a passenger side section. The door subassembly can be pivotable relative to the frame subassembly back-and-forth between a door open position and a door closed position. The door subassembly closes the cargo bed access opening when the door subassembly is in the door closed position.

19 Claims, 6 Drawing Sheets

A2
22
30
46
54
10
14
42
38
22
52
50
18
O
34

10
14
22
30
46
54
38
O
52
18
49

22
42

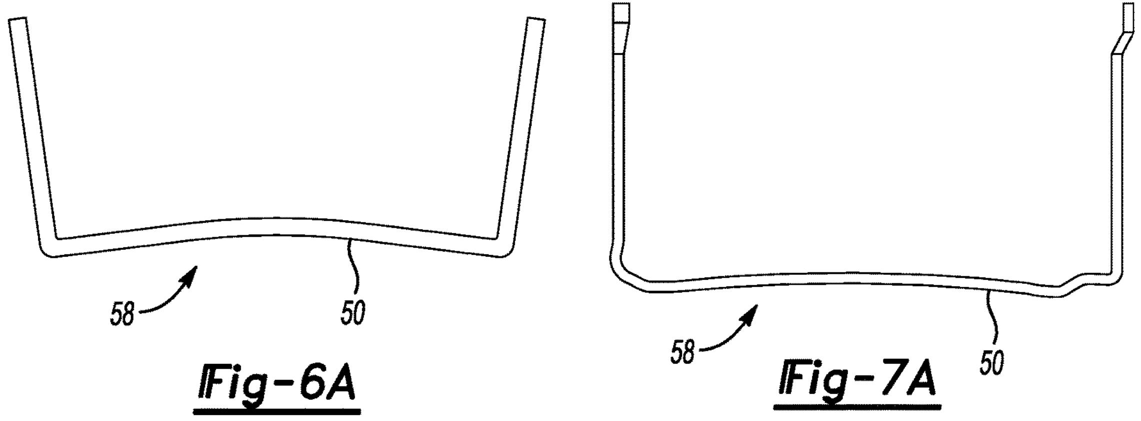
Fig-6A
Fig-7A
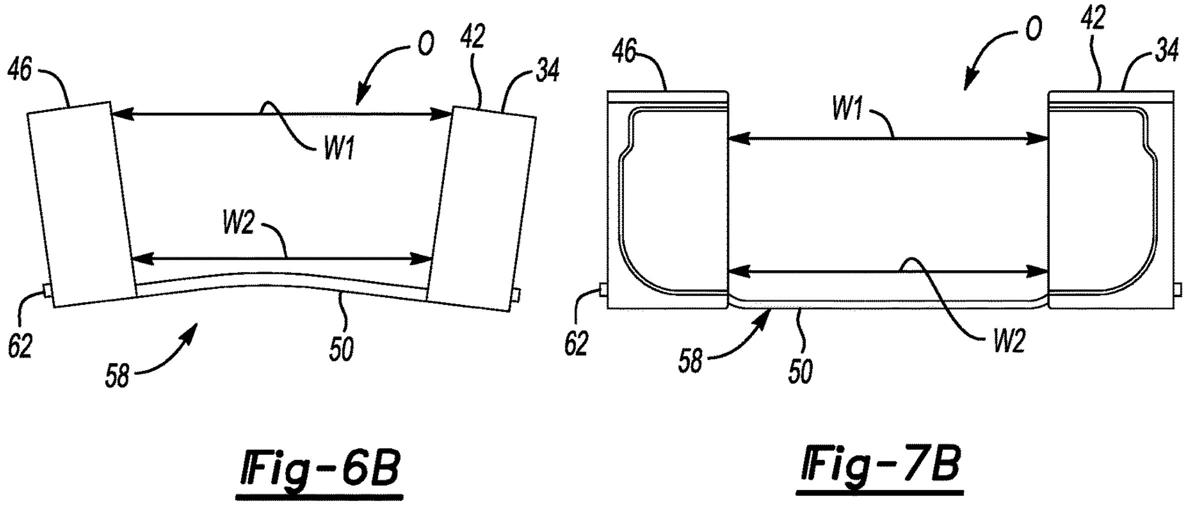
Fig-6B
Fig-7B

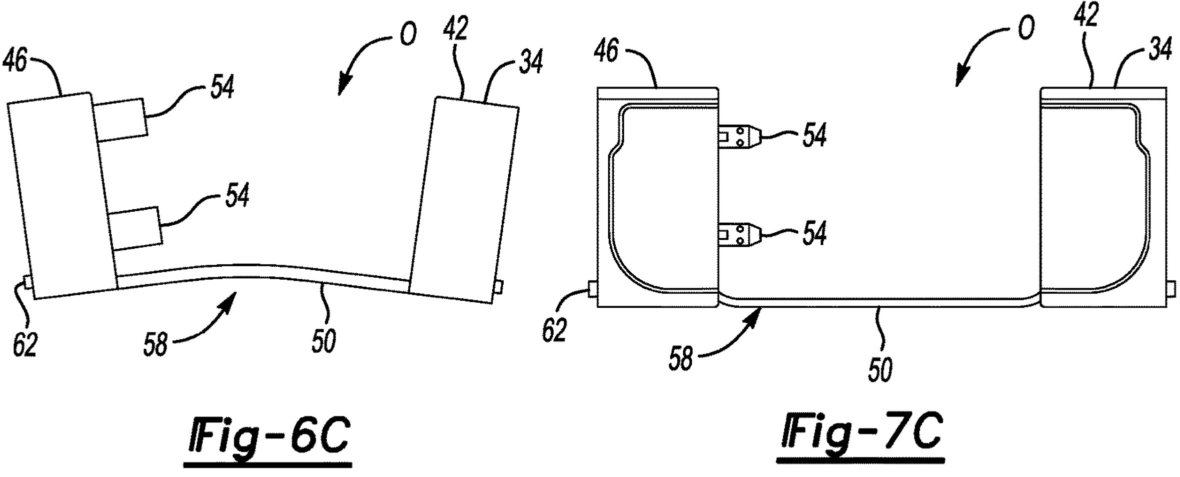
Fig-6C
Fig-7C
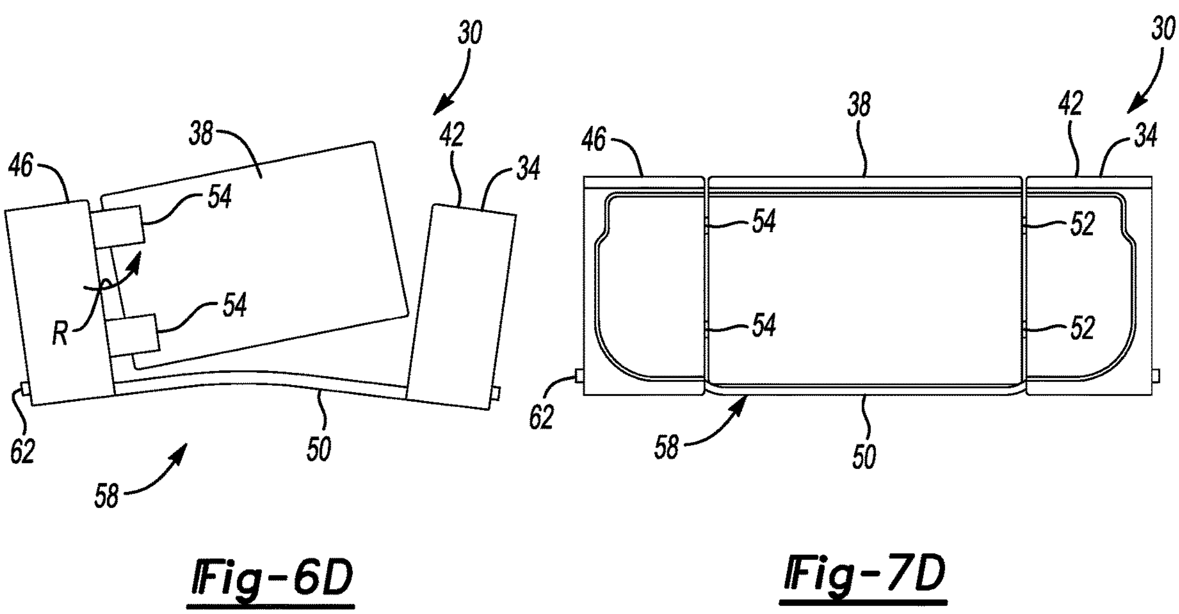
Fig-6D
Fig-7D

TAILGATE SUBASSEMBLY PRESETTING METHOD AND TAILGATE ASSEMBLY HAVING PRESET SUBASSEMBLIES

TECHNICAL FIELD

This disclosure relates generally to a tailgate and, more particularly, to presetting a powered tailgate having a door subassembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

In some aspects, the techniques described herein relate to a tailgate assembly method, including: presetting a frame subassembly of a tailgate assembly relative to a vehicle structure; and presetting a door subassembly of the tailgate assembly relative to the frame subassembly.

In some aspects, the techniques described herein relate to a tailgate assembly method, wherein the frame subassembly includes a cargo bed access opening between a driver side section and a passenger side section, the door subassembly pivotable relative to the frame subassembly back-and-forth between a door open position and a door closed position, the door subassembly closing the cargo bed access opening when the door subassembly is in the door closed position.

In some aspects, the techniques described herein relate to a tailgate assembly method, wherein the presetting of the frame subassembly includes presetting the driver side section and the passenger side section such that the cargo bed access opening is wider at a vertical top of the cargo bed access opening than at a vertical bottom of the cargo bed access opening.

In some aspects, the techniques described herein relate to a tailgate assembly method, wherein the presetting of the frame subassembly includes tilting the driver side section outboard from a design position for the driver side section, and tilting the passenger side section outboard from a design position of the passenger side section.

In some aspects, the techniques described herein relate to a tailgate assembly method, wherein the presetting of the frame subassembly includes providing a bow in a connection member of the frame subassembly prior to securing the frame subassembly to the vehicle structure, the connection member extending along an inboard side of the driver side section, along an inboard side of the passenger side section, and along a bottom of the cargo bed access opening.

In some aspects, the techniques described herein relate to a tailgate assembly, wherein the connection member extends continuously and uninterruptedly from the inboard side of the driver side section, along the bottom of the cargo bed access opening, and to the inboard side of the passenger side section.

In some aspects, the techniques described herein relate to a tailgate assembly, wherein the connection member is a tube.

In some aspects, the techniques described herein relate to a tailgate assembly method, wherein a hinge side of the door subassembly is pivotably connected to one of the driver side section or the passenger side section, wherein a latch side of the door subassembly is latched to the other of the driver side section or the passenger side section.

In some aspects, the techniques described herein relate to a tailgate assembly method, wherein the presetting of the door subassembly includes presetting the door subassembly such that the latch side is shifted vertically above the hinge side within the cargo bed access opening.

In some aspects, the techniques described herein relate to a tailgate assembly method, wherein the tailgate assembly is pivotable relative to the vehicle structure about a horizontal axis back-and-forth between a tailgate closed position and a tailgate open position.

In some aspects, the techniques described herein relate to a tailgate assembly method, wherein the presetting of the frame subassembly offsets the frame subassembly from a design position for the frame subassembly, wherein the presetting of the door subassembly offsets the door subassembly from a design position for the door subassembly.

In some aspects, the techniques described herein relate to a tailgate assembly method, further including securing the frame subassembly to a vehicle cargo bed after presetting the frame subassembly.

In some aspects, the techniques described herein relate to a tailgate assembly method, further including securing the door subassembly to the frame subassembly after presetting the door subassembly.

In some aspects, the techniques described herein relate to a tailgate assembly method, wherein the frame subassembly and the door subassembly are configured pivot together relative to the vehicle structure about a horizontally extending axis, wherein the door subassembly is configured to pivot relative to the frame subassembly about a vertically extending axis.

In some aspects, the techniques described herein relate to a tailgate assembly, including: a frame subassembly having a cargo bed access opening between a driver side section and a passenger side section, the frame subassembly offset from a preset frame subassembly position, the frame subassembly secured to a structure of a vehicle in the preset frame subassembly position; and a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position, the door subassembly offset from a preset door subassembly position, the door subassembly secured to a structure of the vehicle in the preset door subassembly position.

In some aspects, the techniques described herein relate to a tailgate assembly, wherein the frame subassembly and the door subassembly pivot together about a horizontally extending axis, wherein the door subassembly pivots relative to the frame subassembly about a vertically extending axis.

In some aspects, the techniques described herein relate to a tailgate assembly, further including connecting a driver side section of a frame subassembly to a passenger side section of the frame subassembly using a tube.

In some aspects, the techniques described herein relate to a tailgate assembly, wherein the driver side section is on a driver side of the cargo bed access opening in the tailgate assembly, and the passenger side section is on a passenger side of the cargo bed access opening.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIGS. 6A-6E schematically illustrate exemplary steps in a process of presetting a frame subassembly and presetting a door subassembly of the tailgate assembly of FIGS. 1-4.

FIGS. 7A-7E illustrate corresponding views of the tailgate assembly during the steps of FIGS. 6A-6E when viewing a side of the tailgate assembly that faces the cargo bed when the tailgate assembly is installed an in a tailgate closed position.

DETAILED DESCRIPTION

Figure 1:
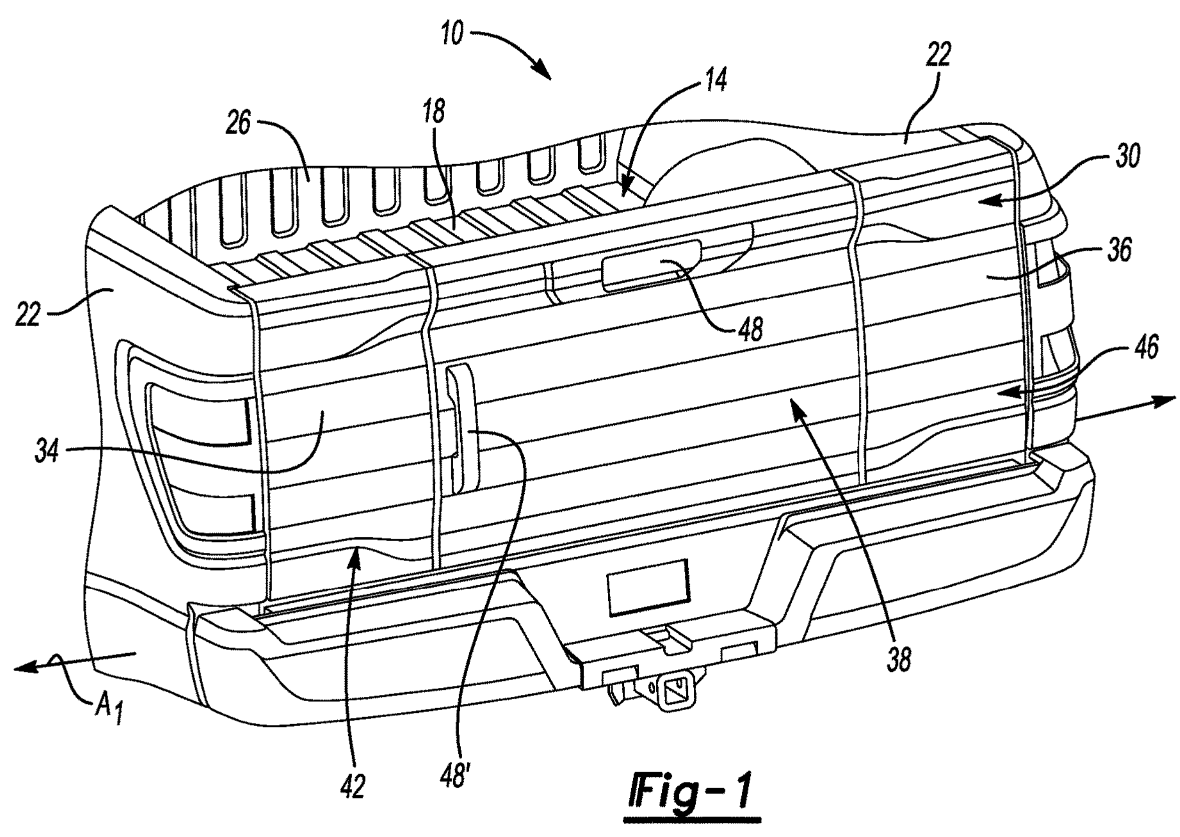
FIG. 1 is a rear perspective view of a motor vehicle equipped with a cargo space and a tailgate assembly positioned in a tailgate closed position relative to the cargo space.

This disclosure details exemplary methods of presetting tailgate assemblies that include door subassemblies. Generally, presetting is the installing of a part in a position misaligned or offset from a desired installed position for that part. After completing installation, the weight of the part causes the part to sag or otherwise move from the preset position into a desired design position for the part.

For example, a vehicle may be designed to have a three to five millimeter gap between a first component that is secured to a vehicle frame and a second component that is secured to the vehicle frame. During assembly, the first component is secured to the vehicle frame. Next, the second component is supported by installation tooling and secured to the vehicle frame with a six to eight millimeter gap to the first component, which "presets" the second component. After the second component is secured and installation tooling is no longer supporting the second component, the weight of the second component causes the second component to sag a bit toward the first component. The sagging reduces the gap between the first component and the second component to the desired three to five millimeter gap.

The preset ensures a desired fit and finish, and that functional requirements are met. Functional requirements can include aligned sealing interfaces, for example.

FIGS. 1-4 illustrate selected portions of a motor vehicle 10 that includes a cargo space for storing and/or hauling cargo. In the illustrated embodiment, the vehicle 10 is a pickup truck and the cargo space is established by a cargo bed 14 of the pickup truck. While a pickup truck with a cargo bed is specifically depicted and referenced herein, other vehicles having other types of cargo spaces could also benefit from the teachings of this disclosure. The vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 14 is generally rearward of a passenger cabin (not shown) of the vehicle 10 and includes a floor 18 extending between a pair of longitudinally extending sidewalls 22, a laterally extending front wall 26, and a tailgate assembly 30. The overall size, shape, and configuration of the cargo bed 14 are not intended to limit this disclosure.

The tailgate assembly 30 can be considered a Multi-Axis Tailgate that includes, among other things, a frame subassembly 34 and a door subassembly 38. The frame subassembly 34, in the exemplary embodiment, includes a driver side section 42, a passenger side section 46, and a connection member 50 (see FIG. 3) connected between the driver side section 42 and the passenger side section 46. The door subassembly 38 may sometimes be referred to as a "swing gate subassembly." The door subassembly 38 is pivotably connected to the passenger side section 46 and latches to the driver side section 42 through a latch assembly 52 when closed. At least one hinge assembly 54 is used to pivotably connect the door subassembly 38 to the passenger side section 46. In another example, the door subassembly 38 is pivotably connected to the driver side section 42 and latches to the passenger side section 46.

Figure 2:
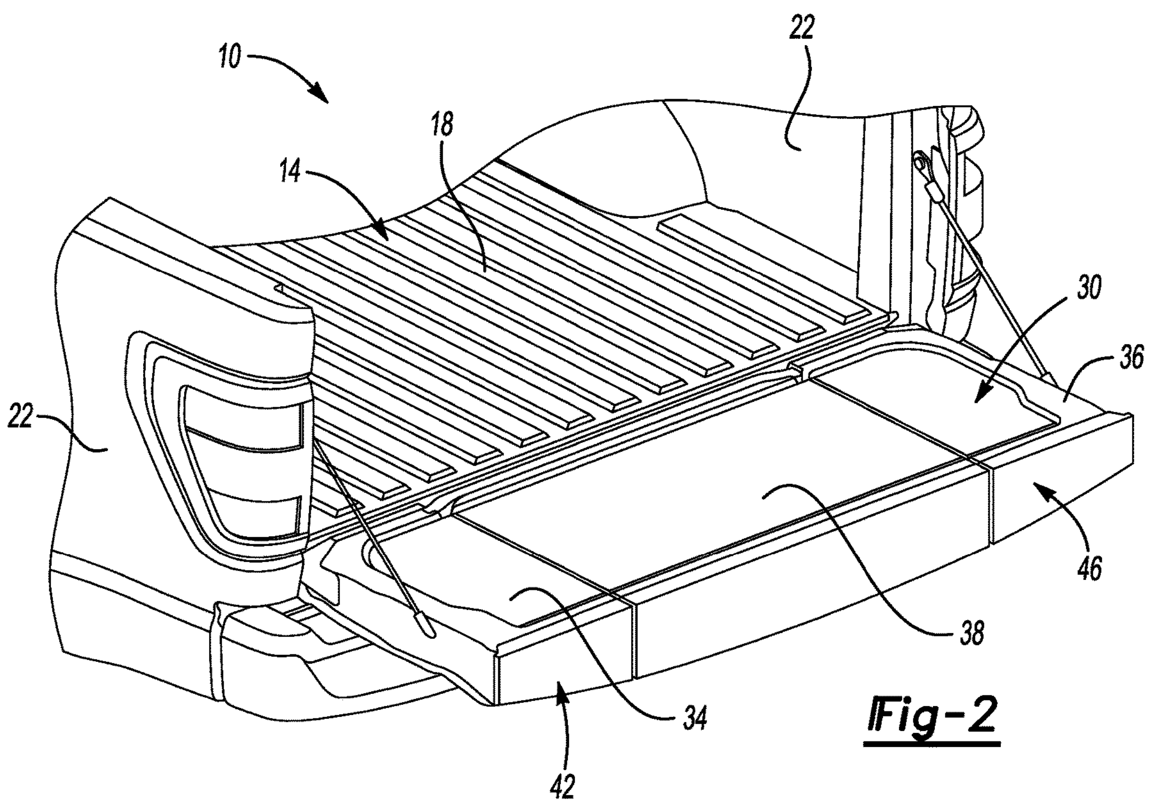
FIG. 2 illustrates the tailgate assembly of FIG. 1 in a tailgate open position.

The tailgate assembly 30 is pivotable about a first axis A1 relative to the cargo bed 14 back-and-forth between a tailgate closed position shown in FIG. 1 and a tailgate open position shown in FIG. 2. The tailgate assembly 30 may be moved from the tailgate closed position to the tailgate open position in response to actuating a first handle 48 of the tailgate assembly 30, for example. The tailgate assembly 30 is vertically aligned when in the tailgate closed position and thus generally encloses an end of the cargo bed 14 that is opposite from the front wall 26, and the tailgate assembly 30 is horizontally aligned when in the tailgate open position and thus generally allows access to the cargo bed 14. Vertical and horizontal, for purposes of this disclosure, are with reference to ground in the ordinary orientation of the vehicle 10 during operation.

The door subassembly 38 of the tailgate assembly 30 is in a door closed position and is latched to the frame subassembly 34 when the frame subassembly 34 and the door subassembly 38 are pivoted between the tailgate closed position and the tailgate open position. Thus, the frame subassembly 34 and the door subassembly 38 pivot together as a unit when the tailgate assembly 30 is transitioned back and forth between the tailgate closed position and the tailgate open position.

Figure 3:
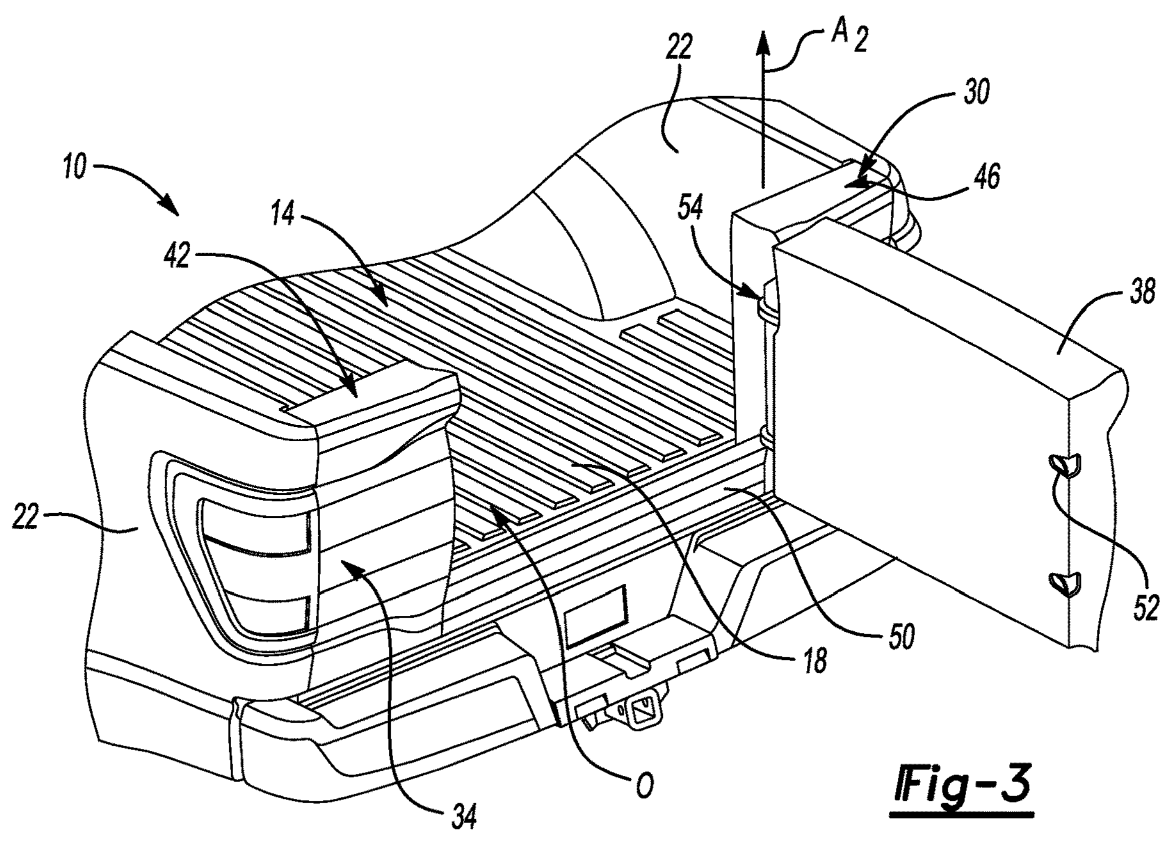
FIG. 3 illustrates a door subassembly of the tailgate assembly of FIG. 1 in a door open position.
Figure 4:
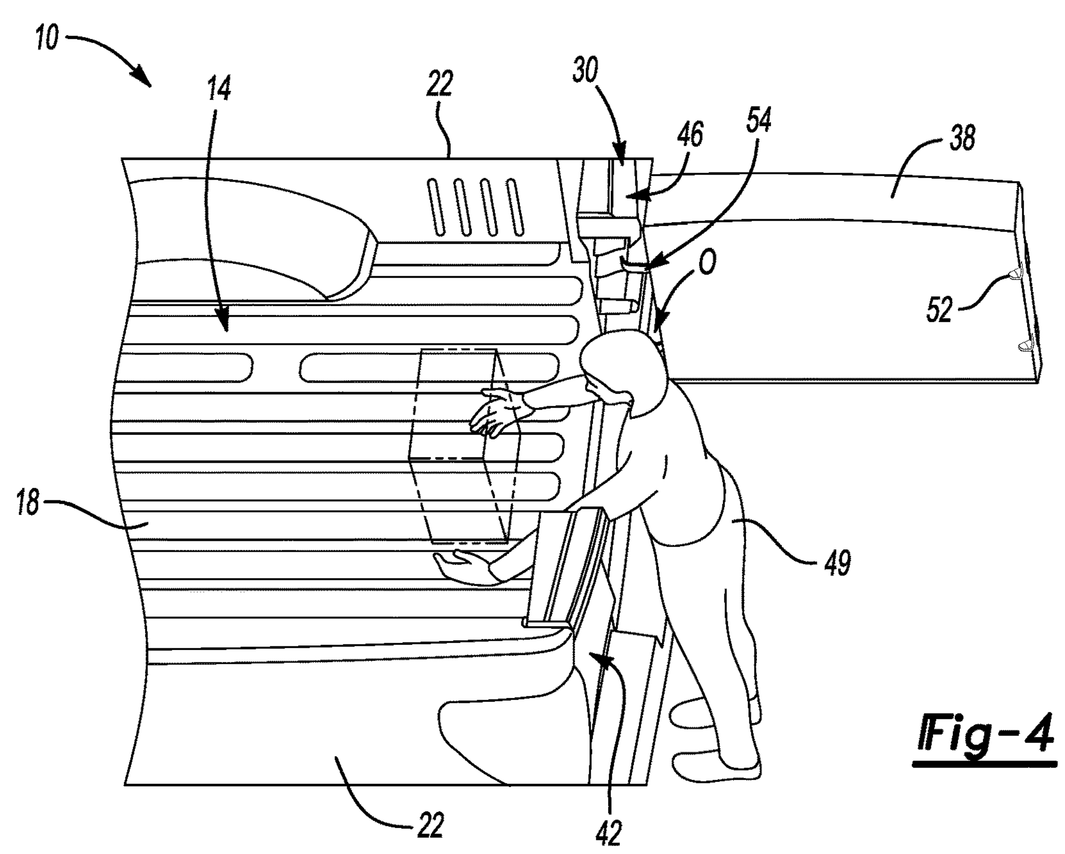
FIG. 4 is a rear and top view of the tailgate assembly and the door subassembly of FIG. 3.

When in the tailgate closed position, the door subassembly 38 is pivotable relative to the frame subassembly 34 about a second axis A2 between the door closed position shown in FIG. 1 and a door open position shown in FIG. 3. In this example, the first axis A1 is a horizontally extending axis, and the second axis A2 is transverse to the first axis A1 and is a vertically extending axis. The door subassembly 38 may be moved between the door closed position and the door open position by grasping a second handle 48' (see FIG. 1) of the tailgate assembly 30, for example.

The door subassembly 38 provides a cargo bed access opening O when moved to the door open position. In an embodiment, the cargo bed access opening O extends vertically downward at least as far as the floor 18 of the cargo bed 14. A user 49 (see FIG. 4) can access the cargo bed 14 through the cargo bed access opening O when the door subassembly 38 is in the door open position. Placing the door subassembly 38 in the door open position allows the user 49 to move closer to the cargo bed 14 than, for example, when the tailgate assembly 30 is positioned in the tailgate open position of FIG. 2. The cargo bed access opening O can also provide clearance for the user 49 to enter the cargo bed 14 to either load or retrieve an item of cargo (see FIG. 4).

Figure 5:
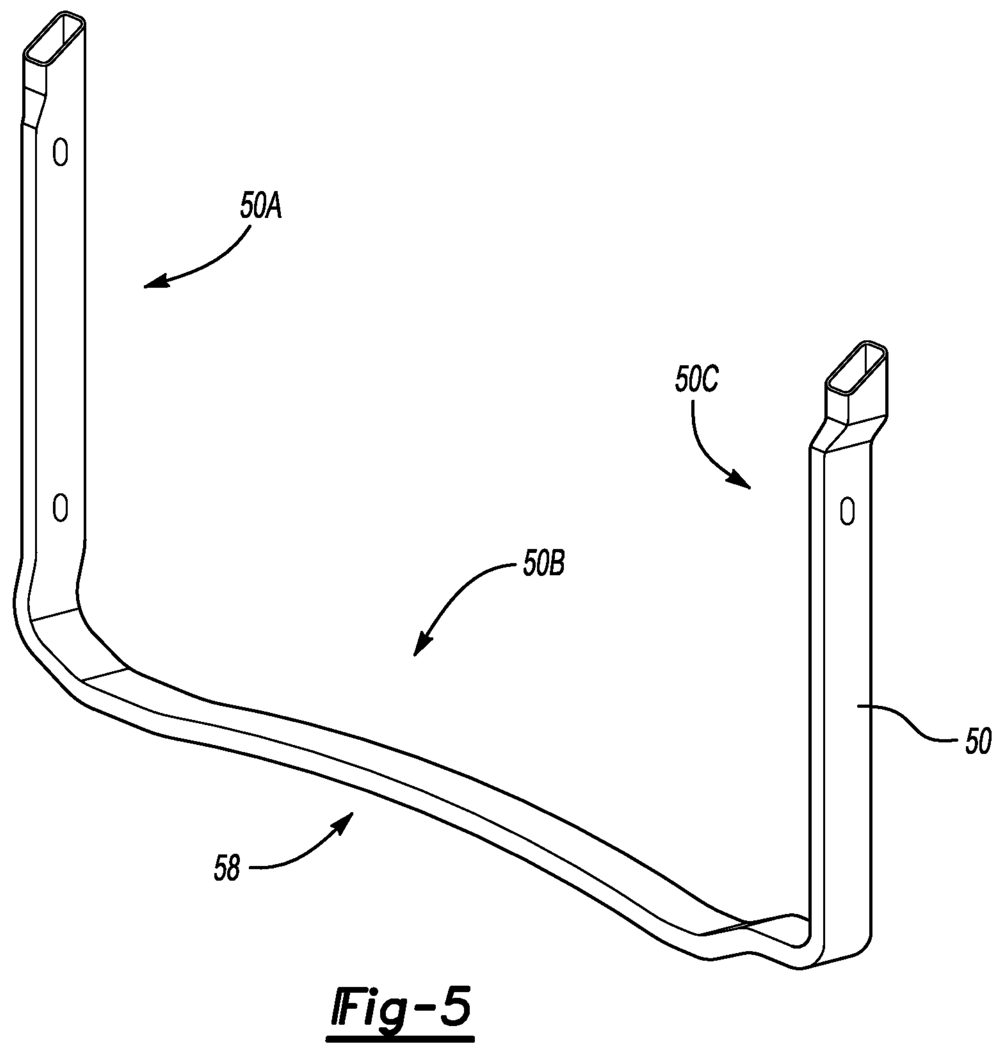
FIG. 5 is a perspective view of a connection member from the tailgate assembly of FIG. 1.

With reference now to FIG. 5, the connection member 50 of the frame subassembly 34 is provided by a U-shaped tube in this example. The connection member 50 includes a portion 50A extending along an inboard side of the driver side section 42, a portion 50C extending along a bottom of the cargo bed axis opening O, and a portion 50C extending along an inboard side of the passenger side section 46. The connection member 50 extends continuously and uninterruptedly from the portion 50A, to the portion 50B, and to the portion 50C.

Figures 6E, 7E:
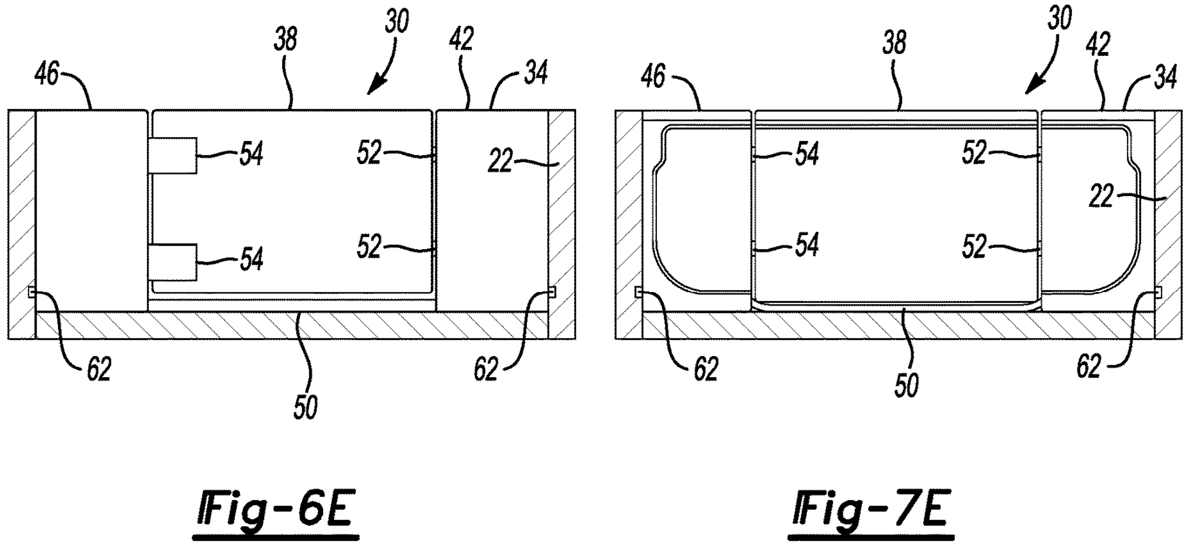

With reference now to FIGS. 6A-7E, an exemplary tailgate assembly method includes presetting the frame subassembly 34 and also presetting the door subassembly 38. The presetting of the frame subassembly 34 is a presetting with reference to the sidewalls 22. The presetting of the door subassembly 38 is with reference to the frame subassembly 38. The schematic views of FIGS. 6A-6B are exaggerated to highlight the presetting of the example tailgate assembly 30 in corresponding FIGS. 7A-7E.

Presetting the frame subassembly 34 begins as shown in FIGS. 6A and 6B where the connection member 50 of the frame subassembly 34 is bent to include a bow 58. In another example, the connection member 50 is formed to include the bow 58 rather than being formed and then bent to include the bow 58.

The bow 58 is in the portion 50B, which extends along the bottom of the cargo bed axis opening O. The bow 58 is an upward bow in this example. The bow 58 causes the portions 50A and 50C to flare away from each other moving away from the portion 50B.

Next, as shown in FIGS. 6B and 7B, the driver side section 42 and the passenger side section 46 are respectively secured to the portion 50A and the portion 50C of the connection member 50. This effectively establishes the opening O in the frame subassembly 34 of the tailgate assembly 30. When secured, the driver side section 42 and the passenger side section 46 are tilted slightly outboard from their intended design positions when installed within the vehicle 10. The tilting results in a width W1 of the cargo bed axis opening O at a vertical top being greater than a width W2 at a vertical bottom of the cargo bed axis opening O. The frame subassembly 34 is in a preset frame subassembly position when the driver side section 42 and the passenger side section 46 are tilted in this way.

Next, the hinge assembly 54 is coupled to the driver side section 42 as shown in FIGS. 6C and 7C. As shown in FIGS. 6D and 7D, the hinge assembly 54 is additionally coupled to the door subassembly 38. The door subassembly 38 and the hinge assembly 54 are secured such that the door subassembly 38 is tilted slightly in a direction R relative to the driver side section 42. This positions the door subassembly 38 in a preset door subassembly position and leads to the gap between the door subassembly 38 and the passenger side section 46 widening moving downward. After the tailgate assembly 30 is installed, the door subassembly 38 rotates from the preset door subassembly position in a direction opposite the direction R to the design position for the door subassembly. This makes the gap between the door subassembly 38 and the passenger side section 46 more consistent moving downward.

The tilting of the door subassembly 38 is a tilting away from an intended position of the door subassembly 38 when installed within the vehicle 10. The tilting of the door subassembly 38 is a presetting of the door subassembly 38 relative to the frame subassembly 34. The tilting causes a side of the door subassembly 38 interfacing with the hinge assembly 54 to be shifted vertically downward relative to a side of the door subassembly 38 that will latch to the passenger side section 46.

As shown in FIGS. 6E and 7E, the tailgate assembly 30 is then positioned in an installed position on the vehicle 10 such that the tailgate assembly 30 is pivotably coupled to the vehicle 10. In the installed position, after assembly tooling supporting the tailgate assembly 30 is removed and the tailgate assembly 30 is supported through attachment pivots 62 to the sidewalls 22 of the vehicle 10, the tailgate assembly 30 and the door subassembly 38 of the tailgate assembly 30 both sag vertically downward. The tailgate assembly 30 moves from the preset frame subassembly position to the design position, which is offset from the preset frame subassembly position.

Since the frame subassembly 34 and the door subassembly 38 were each preset, the frame subassembly 34 and the door subassembly sag into their intended design position. The design position provides desired gaps and margins between the door subassembly 38 and surrounding structures and between the frame subassembly 34 and surrounding structures. The design position provides properly aligned latches utilized to couple the door subassembly 38 to the frame subassembly 34, and maintains desired sealing interfaces The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate assembly method, comprising:

presetting a frame subassembly of a tailgate assembly relative to a vehicle structure; and presetting a door subassembly of the tailgate assembly relative to the frame subassembly, wherein the frame subassembly includes a cargo bed access opening between a driver side section and a passenger side section, the door subassembly pivotable relative to the frame subassembly back-and-forth between a door open position and a door closed position, the door subassembly closing the cargo bed access opening when the door subassembly is in the door closed position, wherein the presetting of the frame subassembly comprises presetting the driver side section and the passenger side section such that the cargo bed access opening is wider at a vertical top of the cargo bed access opening than at a vertical bottom of the cargo bed access opening.

2. The tailgate assembly method of claim 1, wherein the presetting of the frame subassembly comprises tilting the driver side section outboard from a design position for the driver side section, and tilting the passenger side section outboard from a design position of the passenger side section.

3. The tailgate assembly method of claim 1, wherein the presetting of the frame subassembly includes providing a bow in a connection member of the frame subassembly prior to securing the frame subassembly to the vehicle structure, the connection member extending along an inboard side of the driver side section, along an inboard side of the passenger side section, and along a bottom of the cargo bed access opening.

4. The tailgate assembly of claim 3, wherein the connection member extends continuously and uninterruptedly from the inboard side of the driver side section, along the bottom of the cargo bed access opening, and to the inboard side of the passenger side section.

5. The tailgate assembly of claim 3, wherein the connection member is a tube.

6. The tailgate assembly method of claim 1, wherein a hinge side of the door subassembly is pivotably connected to one of the driver side section or the passenger side section, wherein a latch side of the door subassembly is latched to the other of the driver side section or the passenger side section.

7. The tailgate assembly method of claim 6, wherein the presetting of the door subassembly comprises presetting the door subassembly such that the latch side is shifted vertically above the hinge side within the cargo bed access opening.

8. The tailgate assembly method of claim 1, wherein the tailgate assembly is pivotable relative to the vehicle structure about a horizontal axis back-and-forth between a tailgate closed position and a tailgate open position.

9. The tailgate assembly method of claim 1, wherein the presetting of the frame subassembly offsets the frame subassembly from a design position for the frame subassembly, wherein the presetting of the door subassembly offsets the door subassembly from a design position for the door subassembly.

10. The tailgate assembly method of claim 1, further comprising securing the frame subassembly to a vehicle cargo bed after presetting the frame subassembly.

11. The tailgate assembly method of claim 1, further comprising securing the door subassembly to the frame subassembly after presetting the door subassembly.

12. The tailgate assembly method of claim 1, wherein the frame subassembly and the door subassembly are configured to pivot together relative to the vehicle structure about a horizontally extending axis, wherein the door subassembly is configured to pivot relative to the frame subassembly about a vertically extending axis.

13. A tailgate assembly, comprising:

a frame subassembly having a cargo bed access opening between a driver side section and a passenger side section, the frame subassembly offset from a preset frame subassembly position, the frame subassembly secured to a structure of a vehicle in the preset frame subassembly position; and a door subassembly that is pivotably coupled to the frame subassembly, the door subassembly pivotable relative to the frame subassembly back-and-forth between a door open position and a door closed position, the door subassembly closing the cargo bed access opening when the door subassembly is in the door closed position, the door subassembly offset from a preset door subassembly position, the door subassembly secured to a structure of the vehicle in the preset door subassembly position, wherein, in the preset frame subassembly position, the cargo bed access opening is wider at a vertical top of the cargo bed access opening than at a vertical bottom of the cargo bed access opening.

14. The tailgate assembly of claim 13, wherein the frame subassembly and the door subassembly pivot together about a horizontally extending axis, wherein the door subassembly pivots relative to the frame subassembly about a vertically extending axis.

15. The tailgate assembly of claim 13, further comprising connecting the driver side section of a frame subassembly to the passenger side section of the frame subassembly using a tube.

16. The tailgate assembly of claim 13, wherein the driver side section is on a driver side of the cargo bed access opening in the tailgate assembly, and the passenger side section is on a passenger side of the cargo bed access opening.

17. The tailgate assembly of claim 13, wherein, in the preset frame subassembly position, the driver side section is tilted outboard from a design position for the driver side section, and the passenger side section is tilted outboard from a design position of the passenger side section.

18. A tailgate assembly method, comprising:

presetting a frame subassembly of a tailgate assembly relative to a vehicle structure by tilting a driver side section outboard from a design position for the driver side section, and by tilting a passenger side section outboard from a design position for the passenger side section, the frame assembly including a cargo bed access opening between the driver side section and the passenger side section; and securing a door subassembly to the frame such that the door subassembly is pivotable relative to the frame subassembly back-and-forth between a door open position and a door closed position, the door subassembly closing the cargo bed access opening when the door subassembly is in the door closed position.

19. The tailgate assembly method of claim 18, further comprising presetting the door subassembly during the securing such that the door subassembly is offset from a design position for the door subassembly.

* * * * *